(12) United States Patent
Ramlall

(10) Patent No.: US 9,880,259 B2
(45) Date of Patent: Jan. 30, 2018

(54) METHOD FOR ESTIMATING THE POSITION OF A MOBILE STATION USING TOA, AOA, AND DOPPLER-SHIFT

(71) Applicant: SPAWAR Systems Center Pacific, San Diego, CA (US)

(72) Inventor: Rohan Yash Ramlall, Brentwood, CA (US)

(73) Assignee: The United States of America as represented by Scretary of the Navy, Washington, DC (US)

(*) Notice: Subject to any disclaimer, the term of this patent is extended or adjusted under 35 U.S.C. 154(b) by 184 days.

(21) Appl. No.: 14/981,100

(22) Filed: Dec. 28, 2015

(65) Prior Publication Data

US 2017/0123046 A1     May 4, 2017

Related U.S. Application Data

(60) Provisional application No. 62/248,078, filed on Oct. 29, 2015.

(51) Int. Cl.
*G01S 5/06* (2006.01)
(52) U.S. Cl.
CPC .................................... *G01S 5/06* (2013.01)
(58) Field of Classification Search
CPC ....................................................... G01S 5/06
USPC ............ 455/404.2, 412.1–414.2, 418–422.1, 455/456.1–456.3, 456, 457
See application file for complete search history.

(56) References Cited

U.S. PATENT DOCUMENTS

| | | | | |
|---|---|---|---|---|
| 7,518,958 B2* | 4/2009 | Ishii | ...................... | G04R 20/02 342/357.74 |
| 9,648,460 B2* | 5/2017 | Harper | ................... | H04W 4/025 |
| 2004/0127228 A1* | 7/2004 | You | ......................... | G01S 5/021 455/456.1 |
| 2005/0148346 A1* | 7/2005 | Maloney | ................. | G01S 19/09 455/456.6 |
| 2006/0029031 A1* | 2/2006 | Koorapaty | ........ | H04W 56/0045 370/350 |
| 2007/0150362 A1* | 6/2007 | Sharma | .............. | G06Q 30/0603 705/26.64 |

(Continued)

OTHER PUBLICATIONS

Yaqin et al. "Localization by Hybrid TOA, AOA, and DSF Estimation in NLOS Environment", IEEE Document, Published Oct. 4, 2010.*

(Continued)

*Primary Examiner* — Babar Sarwar
(74) *Attorney, Agent, or Firm* — SPAWAR Systems Center Pacific; J. Eric Anderson; Young Fei

(57) ABSTRACT

A method for estimating the position of a mobile station (MS) comprising the following steps: physically moving the MS at a constant velocity v in an environment comprising S stationary scatterers; wirelessly transmitting N uplink communication signals from a transmitter physically mounted to the MS; receiving each of the N uplink signals via D distinct paths at a fixed-location base station (BS); recording with the BS a time of arrival (TOA) τ, an angle-of-arrival (AOA) θ, and a Doppler-shifted frequency (DSF) ς of each received uplink signal; estimating the location of the MS using a least squares algorithm based on the TOA, the AOA, and the DSF.

14 Claims, 12 Drawing Sheets

(56) References Cited

U.S. PATENT DOCUMENTS

| | | | | |
|---|---|---|---|---|
| 2009/0310505 | A1* | 12/2009 | Tsai | G01S 5/14 370/252 |
| 2010/0225541 | A1* | 9/2010 | Hertzog | G01S 5/0221 342/387 |
| 2010/0309051 | A1* | 12/2010 | Moshfeghi | G01S 5/0236 342/378 |
| 2011/0035284 | A1* | 2/2011 | Moshfeghi | G06Q 30/02 705/14.58 |
| 2011/0074631 | A1* | 3/2011 | Parker | G01S 5/16 342/378 |
| 2012/0256789 | A1* | 10/2012 | Bull | G01S 5/0221 342/357.25 |
| 2013/0130710 | A1* | 5/2013 | Boyer | H04W 64/00 455/456.1 |
| 2016/0330643 | A1* | 11/2016 | Sahin | H04W 16/14 |

OTHER PUBLICATIONS

K. Papakonstantinou, D. Slock, "Hybrid TOA/AOD/Doppler-Shift localization algorithm for NLOS environments," 2009 IEEE 20th International Symposium on Personal, Indoor and Mobile Radio Communications, pp. i948-1952, Sep. 2009.

Y. Xie, et al., "Localization by Hybrid TOA, AOA and DSF Estimation in NLOS Environments," 2010 IEEE Vehicular Technology Conference Fall (VTC 2010), pp. 1-5, Sep. 2010.

J. Chen, F. Jiang, A. Swindlehurst, J. Lopez-Salcedo, "Localization of mobile equipment in radio environments with no line-of-sight path,"Proc. IEEE ICASSP, Vancouver, BC, Canada, May 2013, pp. 4081-4085.

X. Wei, N. Palleit, T. Weber, "AOD/AOA/TOA-based 3D Positioning in NLOS Multipath Environments," in Proc. IEEE PIMRC, Toronto, Canada, Sep. 2011, pp. 1294-1298.

S. Chen, C. Seow, S. Tan, "Virtual Reference Device-Based NLOS Localization in Multipath Environment," IEEE Antennas Wireless Propag. Lett., vol. 13, pp. 1409-1412, Jul. 2014.

C. K. Seow and S. Y. Tan, "Non-line-of-sight localization in multipath environments," IEEE Trans. Mobile Comput., vol. 7, No. 5, pp. 647-660, May 2008.

H. Miao, K. Yu, M. Juntti, "Positioning for NLOS Propagation: Algorithm Derivations and Cramer-Rao Bounds," IEEE Trans. Veh. Technol., vol. 56, No. 5, pp. 2568-2580, Sep. 2007.

L. Yi, S. Razul, Z. Lin; C. See, "Target Tracking in Mixed LOS/NLOS Environments Based on Individual Measurement Estimation and LOS Detection," IEEE Trans. Wireless Commun., vol. 13, No. 1, pp. 99-111, Jan.

\* cited by examiner

METHOD FOR ESTIMATING THE POSITION OF A MOBILE STATION USING TOA, AOA, AND DOPPLER-SHIFT

CROSS-REFERENCE TO RELATED APPLICATION

This application claims the benefit of U.S. Provisional Application No. 62/248,078, filed 29 Oct. 2015, titled "Method for Estimating the Position of a Mobile Station Using TOA, AOA, and Doppler-Shift" (Navy Case #103109).

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 103109.

BACKGROUND OF THE INVENTION

Location estimation in wireless communications systems is an open problem. This is due to the fact that in non-line-of-sight (NLOS) propagation paths multipath is one of the major sources of error for location estimation because of the bias it introduces in the time of arrival (TOA) estimate.

SUMMARY

Disclosed herein is a method for estimating the position of a mobile station (MS) comprising the following steps. The first step provides for physically moving the MS at a constant velocity v in an environment comprising S stationary scatterers. The next step provides for wirelessly transmitting N uplink communication signals from a transmitter physically mounted to the MS. The next step provides for receiving each of the N uplink signals via D distinct paths at a fixed-location base station (BS). The next step provides for recording with the BS a time of arrival (TOA) $\tau$, an angle-of-arrival (AOA) $\theta$, and a Doppler-shifted frequency (DSF) $\varsigma$ of each received uplink signal. The next step provides for estimating the location of the MS using a least squares algorithm based on the TOA, the AOA, and the DSF.

The method may also be described as comprising the following steps. The first step provides for physically moving the mobile station (MS) at a constant velocity v through line-of-sight (LOS) and non-line-of-sight (NLOS) zones within an environment comprising S stationary scatterers. The next step provides for wirelessly transmitting N uplink communication signals from a transmitter physically mounted to the MS. The next step provides for receiving at least 2 N uplink signals at a fixed-location base station (BS), wherein every received uplink signal is treated by the BS as if every received uplink signal followed an NLOS propagation path regardless of the actual propagation path. The next step provides for recording with the BS a time of arrival (TOA) $\tau$, an angle-of-arrival (AOA) $\theta$, and a Doppler-shifted frequency (DSF) of each received uplink signal. The next step provides for estimating the location of the MS using a least squares algorithm based on the TOA, the AOA, and the DSF.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
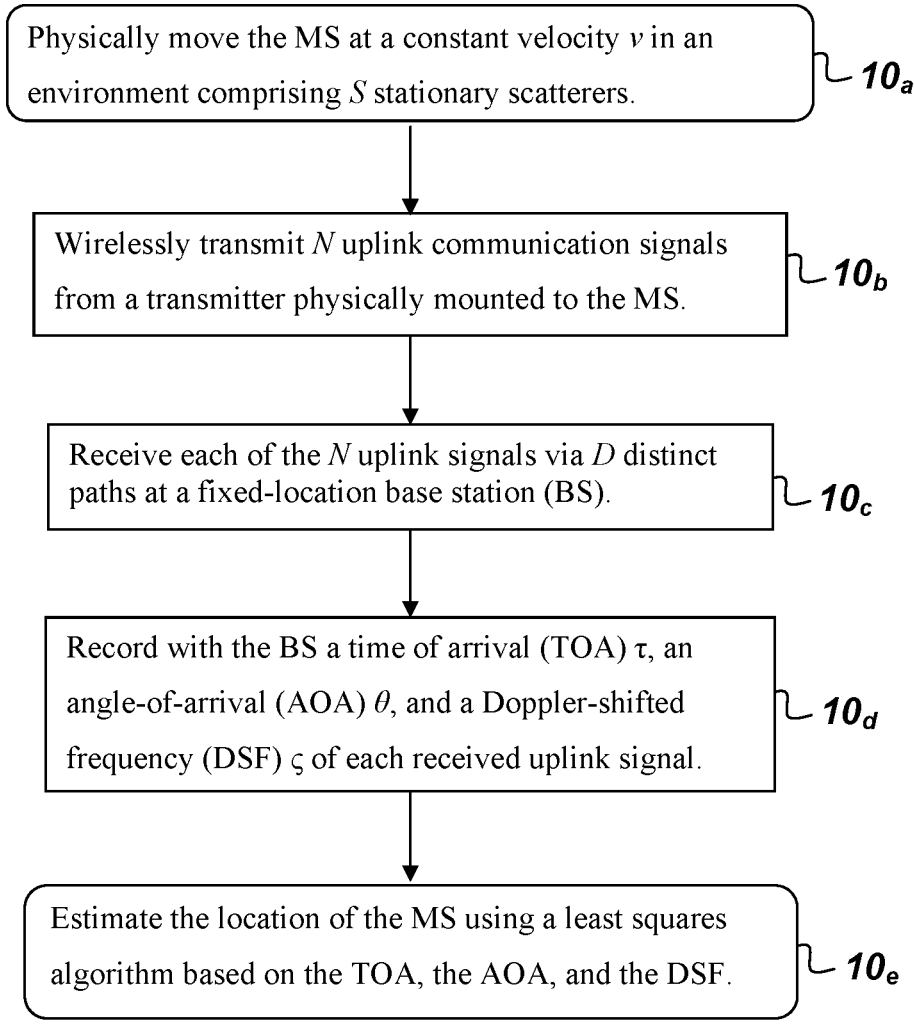
FIG. 1 is a method flowchart.

FIG. 1 is a flowchart illustrating the steps of a method 10 for estimating the position of a mobile station (MS). Method 10 comprises, consists of, or consists essentially of the following steps. The first step $10_a$ provides for physically moving the MS at a constant velocity v in an environment comprising S stationary scatterers. The next step $10_b$ provides for wirelessly transmitting N uplink communication signals from a transmitter physically mounted to the MS. The next step $10_c$ provides for receiving each of the N uplink signals via D distinct paths at a fixed-location base station (BS). The next step $10_d$ provides for recording with the BS a time of arrival (TOA) $\tau$, an angle-of-arrival (AOA) $\theta$, and a Doppler-shifted frequency (DSF) $\varsigma$ of each received uplink signal. The next step $10_e$ provides for estimating the location of the MS using a least squares (LS) algorithm based on the TOA, the AOA, and the DSF.

Figure 2:
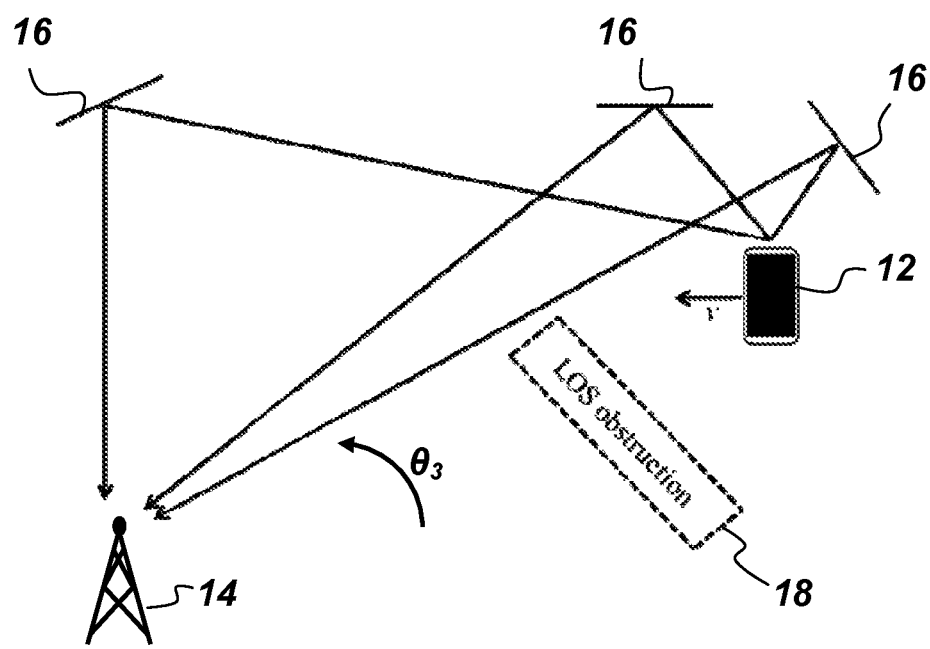
FIG. 2 is a 2-dimensional illustration of an operating environment.

FIG. 2 is a two-dimensional representation of an environment where the method 10 may be used and shows the MS 12, the BS 14, three scatterers 16, and a line-of-sight (LOS) obstruction 18. One embodiment of the least squares algorithm comprises, consists of, or consists essentially of two steps: in the first step, the location of the scatterers 16 and speed of the MS 12 are estimated using a system of linear equations. In the second step, the location of the MS 12 is estimated using nonlinear LS. The velocity of the MS 12 can also be estimated using LS in an additional step. For example, one BS 14 observes N uplink communication signals from the MS 12. The MS 12 is assumed to move at a constant velocity v for a period of time NΔt (which is small, where Δt is the time between signal transmissions) while the N uplink signals are transmitted. Each of the N uplink signals arrives at the BS 14 via S distinct paths due to the presence of S scatterers 16. Although FIG. 2 depicts three scatters 16 it is to be understood that the usefulness of method 10 is not limited to environments with three scatterers 16, but may be used in any NLOS environment or even environments with NLOS and LOS propagation paths. It may be assumed that all NS signals undergo a single-bounce reflection with one scatterer 16 before arriving at the BS 14. Here, the term reflection refers to specular reflections. Any signals that undergo multiple bounces are assumed to be attenuated enough that their contribution at the BS 14 is negligible. Hence, in some scenarios, there is no LOS communication path between the BS 14 and the MS 12. It may also be assumed that clocks on the BS 14 and MS 12 are synchronized in time and frequency. The position of the BS 14 is assumed to be fixed and known, and the positions of the scatterers 16 are assumed to be fixed and unknown. Both the position and velocity of the MS 12 are assumed to be unknown. Note that the algorithm can readily be extended to cases with more than one BS 14.

The MS 12 may be any communication device that is able to transmit wireless radio frequency (RF) signals to the BS 14. The BS 14 may be any fixed-location wireless RF transceiver with multiple antennas. For example, the BS 14 may provide any MS 12 within its communication range the ability to transmit and receive voice and data on the cellular network. The scatterer 16 may be any object capable of reflecting a wireless RF signal such as a tree, hill, building, or metallic object like a car. The LOS obstruction 18 may be any object (e.g., tree, hill, building, etc) physically located between the MS 12 and BS 14 that does not allow the wireless RF signal to travel directly from the MS 12 to the BS 14.

Figure 3:
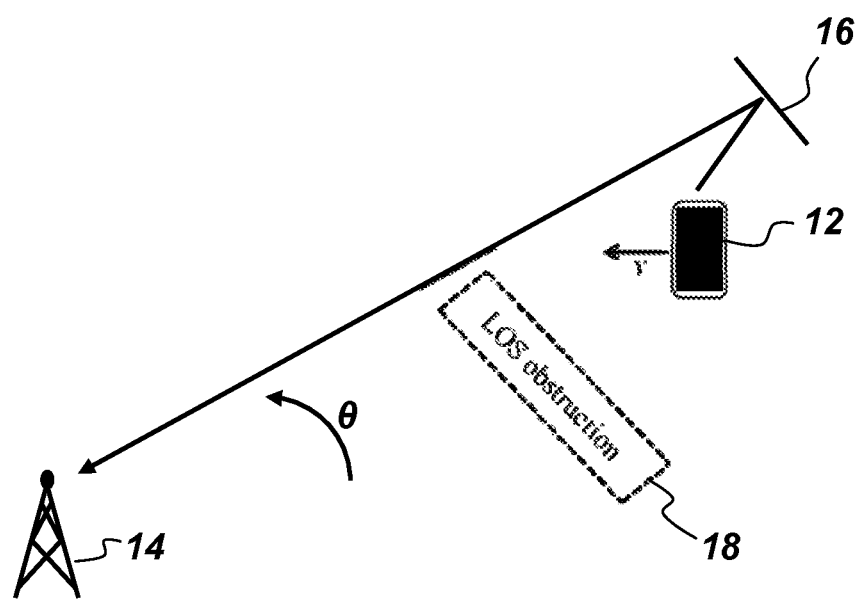
FIG. 3 is a 2-dimensional illustration of an operating environment.

FIG. 3 is a two-dimensional representation of an environment where the method 10 may be used and shows the MS 12, the BS 14, one scatterer 16, and LOS obstruction 18. The BS 14 measures the time of arrival τ, angle of arrival θ, and Doppler-shift ς of all NS signals. For notational simplicity, let us first look at the measurements obtained from one BS 14 and one scatterer 16, such as is displayed in FIG. 3. From geometry, the distance between the scatterer 16 and BS 14 is given by $$d_{sc,bs} = \frac{x_{sc} - x_{bs}}{\cos\theta} = \frac{y_{sc} - y_{bs}}{\sin\theta} \quad (1)$$

where $[x_{sc}\ y_{sc}]^T$ is the position of the scatterer 16, $[x_{bs}\ y_{bs}]^T$ is the position of the BS 14, and θ is the mean of the N AOA measurements of the signals arriving at the BS 14 after reflecting off the scatterer 16. Cross multiplying the terms in (1) produces $$x_{sc}\sin\theta - y_{sc}\cos\theta = x_{bs}\sin\theta - y_{bs}\cos\theta \quad (2)$$

The TOA measurement at time nΔt of the signal arriving at the BS after reflecting off the scatterer 16 is given by $$c\tau(n\Delta t) = \sqrt{(x_{sc}-x_{ms}(n\Delta t))^2+(y_{sc}-y_{ms}(n\Delta t))^2} + \sqrt{(x_{sc}-x_{bs})^2+(y_{sc}-y_{bs})^2} \quad (3)$$

for n=0, . . . , N−1, where c is the propagation speed of the uplink signal (3×10⁸ m/s) and $[x_{ms}(n\Delta t)\ y_{ms}(n\Delta t)]^T$ is the position of the MS 12 at time nΔt.

The Doppler shift (DS) measurement at time nΔt of the signal arriving at the BS after reflecting off the scatterer 16 is given by $$\varsigma(n\Delta t) = f_R(n\Delta t) - f_T = \frac{f_T}{c}\frac{v_x(x_{sc}-x_{ms}(n\Delta t))+v_y(y_{sc}-y_{ms}(n\Delta t))}{\sqrt{(x_{sc}-x_{ms}(n\Delta t))^2+(y_{sc}-y_{ms}(n\Delta t))^2}} \quad (4)$$

for n=0, . . . , N−1, where $f_R$ is the frequency of the received signal, $f_T$ is the frequency of the transmitted signal, and $[v_x\ v_y]^T$ is the velocity of the MS 12. Since the BS 14 and scatterer 16 are both stationary, the DS observed at the BS 14 is the same as the DS observed at the scatterer 16.

The following is a description of a least squares algorithm that may be used with method 10. Utilizing equation (3), equation (4) can be written as $$\varsigma(n\Delta t) = \frac{f_T}{c}\frac{v_x(x_{sc}-(x_{ms}(0)+v_x n\Delta t))+v_y(y_{sc}-(y_{ms}(0)+v_y n\Delta t))}{c\tau(n\Delta t)-d_{sc,bs}} \quad (5)$$

Substituting equation (1) into equation (5), and after some simplification, equation (5) can be written as $$-2\frac{f_T}{c}v_x x_{ms}(0) - 2\frac{f_T}{c}v_y y_{ms}(0) + \left(\varsigma(n\Delta t)\sec\theta + 2\frac{f_T}{c}v_x\right)x_{sc} + \left(\varsigma(n\Delta t)\csc\theta + 2\frac{f_T}{c}v_y\right)y_{sc} = (2c\tau(n\Delta t)+x_{bs}\sec\theta+y_{bs}\csc\theta)\varsigma(n\Delta t) + 2\frac{f_T}{c}n\Delta t(v_x^2+v_y^2) \quad (6)$$

Subtracting (6) at n=0 from (6) at n=1, . . . , N−1 results in $$\sec\theta(\varsigma(n\Delta t)-\varsigma(0))x_{sc}+\csc\theta(\varsigma(n\Delta t)-\varsigma(0))y_{sc}-2\frac{f_T}{c}n\Delta t(v_x^2+v_y^2) = \\ (2c\tau(n\Delta t)+x_{bs}\sec\theta+y_{bs}\csc\theta)\varsigma(n\Delta t) - \\ (2c\tau(0)+x_{bs}\sec\theta+y_{bs}\csc\theta)\varsigma(0) \quad (7)$$

for n=1, . . . , N−1.

Equations (2) and (7) can be combined for S scatterers 16 to form a linear model as follows. For scatterer i, define $A_i$ and $b_i$ as (see equation (9))

$$A_i = \begin{bmatrix} \sin\theta_i & -\cos\theta_i \\ \sec\theta_i(\varsigma_i(\Delta t)-\varsigma_i(0)) & \csc\theta_i(\varsigma_i(\Delta t)-\varsigma_i(0)) \\ \vdots & \vdots \\ \sec\theta_i(\varsigma_i((N-1)\Delta t)-\varsigma_i(0)) & \csc\theta_i(\varsigma_i((N-1)\Delta t)-\varsigma_i(0)) \end{bmatrix} \quad (8)$$

$$b_i = \begin{bmatrix} x_{bs}\sin\theta_i - y_{bs}\cos\theta_i \\ (2c\tau_i(\Delta t)+x_{bs}\sec\theta_i+y_{bs}\csc\theta_i)\varsigma_i(\Delta t) - \\ (2c\tau_i(0)+x_{bs}\sec\theta_i+y_{bs}\csc\theta_i)\varsigma_i(0) \\ \vdots \\ (2c\tau_i((N-1)\Delta t)+x_{bs}\sec\theta_i+y_{bs}\csc\theta_i)\varsigma_i((N-1)\Delta t) - \\ (2c\tau_i(0)+x_{bs}\sec\theta_i+y_{bs}\csc\theta_i)\varsigma_i(0) \end{bmatrix} \quad (9)$$

Also define $$A_v = \begin{bmatrix} 0 \\ -2\frac{f_T}{c}\Delta t \\ \vdots \\ -2\frac{f_T}{c}(N-1)\Delta t \end{bmatrix} \quad (10)$$

so that the linear model is given by $$As = b \quad (11)$$

where $$A = \begin{bmatrix} A_1 & & & A_v \\ & A_2 & & A_v \\ & & \ddots & \vdots \\ & & & A_S & A_v \end{bmatrix} \quad (12)$$

$$s = \begin{bmatrix} x_{sc,1} \\ y_{sc,1} \\ x_{sc,2} \\ y_{sc,2} \\ \vdots \\ x_{sc,S} \\ y_{sc,S} \\ v_x^2 + v_y^2 \end{bmatrix} \quad (13)$$

$$b = \begin{bmatrix} b_1 \\ b_1 \\ \vdots \\ b_S \end{bmatrix} \quad (14)$$

Note that all of the entries in A besides the entries shown are 0. From (11), the least squares estimate of the position of the S scatterers 16 and squared magnitude of the MS 12 velocity is given by $$\hat{s} = (A^T A)^{-1} A^T b \quad (15)$$

Now that the position of the scatterers 16 has been estimated, the position of the MS 12 can be estimated at any time not for n=0, ..., N−1 as follows. The distance between the MS 12 and a scatterer i at time not is given by $$d_i(n\Delta t) = c\tau_i(n\Delta t) - \sqrt{(x_{bs} - \hat{x}_{sc,i})^2 + (y_{bs} - \hat{y}_{sc,i})^2} \quad (16)$$

Since the signals experience line-of-sight propagation from the MS 12 to the scatterers 16 and estimates of both the scatterer 16 positions and distance between the MS 12 and scatterers 16 are available, the problem is now that of a conventional TOA positioning problem. For the results presented herein an iterative technique based on Taylor Series expansion around an initial MS 12 position estimate approximately equal to the position of the BS 14.

In the subsequent simulation results, the iterative technique may be considered to have diverged if more than 20 iterations are required for the 2-norm of the difference in consecutive MS 12 position estimates to be less than 1 cm. If desired, the scatterer 16 position estimates from equation (15) and the MS 12 position estimates from above can be substituted into equation (4) to solve for the MS 12 velocity using LS.

The performance of the proposed algorithm has been demonstrated through Monte Carlo simulations with 1000 realizations. For example, in one embodiment, the initial position of the MS 12 is $[x_{ms}(0)\ y_{ms}(0)]^T = [5000\ m\ 5000\ m]^T$; and the positions of the BS 14 and scatterers 16 are chosen according to an independent and identically distributed (i.i.d.) Gaussian random variable with mean 5000 m and standard deviation depending on if the cellular environment is a picocell, microcell, or macrocell (see Table I). The velocity of the MS 12 is $[v_x\ v_y]^T = [0.6\ m/s\ -0.8\ m/s]^T$ in the picocellular environment and $[v_x\ v_y]^T = [10\ m/s\ 18\ m/s]^T$ in the microcellular and macrocellular environments. $\Delta t = 50$ ms and $f_T = 2.1$ GHz.

TABLE I

CELLULAR ENVIRONMENT

|  | $\sigma_{BS}$ | $\sigma_{SC}$ |
|---|---|---|
| Picocell | 100 m | 100 m |
| Microcell | 1 km | 700 m |
| Macrocell | 10 km | 1 km |

Tables II and III show the standard deviation of the measurement errors that are required to achieve the accuracy mandated by Enhanced 911 positioning requirement of less than 50 m accuracy in 67% of positioning attempts for one BS 14 and S=3 scatterers 16. The aforementioned Enhanced 911 requirement applies to user equipment (UE)-based positioning methods, whereas method 10 may be described as a network-based method whose Enhanced 911 requirement is less than 100 m accuracy in 67% of positioning attempts. In the picocellular environments, the results shown are for an accuracy of less than 10 m in 67% of positioning attempts, since 50 m level accuracy in picocells does not convey much information about the location of the MS 12.

TABLE II

MEASUREMENT ERROR, 3 SCATTERERS, N = 100

| | Picocell | | | Microcell | | | Macrocell | | |
|---|---|---|---|---|---|---|---|---|---|
| | $\sigma_\tau$ | $\sigma_\theta$ | $\sigma_\zeta$ | $\sigma_\tau$ | $\sigma_\theta$ | $\sigma_\zeta$ | $\sigma_\tau$ | $\sigma_\theta$ | $\sigma_\zeta$ |
| Proposed Algorithm | 1.3 ps | 41° | 10 µHz | 60 ps | 22° | 1 mHz | 50 ps | 2° | 1 mHz |
| Algorithm from [2] | 0.6 ps | 24° | 500 nHz | 20 ps | 11° | 80 µHz | 20 ps | 1° | 40 µHz |

TABLE III

MEASUREMENT ERROR, 3 SCATTERERS, N = 200

| | Picocell | | | Microcell | | | Macrocell | | |
|---|---|---|---|---|---|---|---|---|---|
| | $\sigma_\tau$ | $\sigma_\theta$ | $\sigma_\zeta$ | $\sigma_\tau$ | $\sigma_\theta$ | $\sigma_\zeta$ | $\sigma_\tau$ | $\sigma_\theta$ | $\sigma_\zeta$ |
| Proposed Algorithm | 5 ps | 57° | 50 µHz | 200 ps | 28° | 7 mHz | 200 ps | 2° | 3 mHz |
| Algorithm from [2] | 2 ps | 34° | 1 µHz | 90 ps | 16° | 100 µHz | 90 ps | 1° | 80 µHz |

TABLE IV

MEASUREMENT ERROR, 2 SCATTERERS

| | Microcell | | |
|---|---|---|---|
| | $\sigma_\tau$ | $\sigma_\theta$ | $\sigma_\varsigma$ |
| Proposed Algorithm (N = 100) | 5 ps | 5° | 200 µHz |
| Proposed Algorithm (N = 200) | 20 ps | 7° | 600 µHz |

The quantities in Tables II and III are found empirically by assuming that only one of the measurements at each time step has errors, while the other two are perfect. For each column, only the type of measurement stated in row 2 (i.e., TOA, AOA, or DS) has i.i.d. zero mean Gaussian noise with a standard deviation given by the table entry and the rest of measurements are perfect. For example, in the third row and second column of Table II, the value of 1.3 ps for $\sigma_\tau$ means that the TOA measurement must have a standard deviation below 1.3 ps in order to achieve the desired positioning accuracy, assuming that the DS and AOA measurement errors are zero.

Table II shows the tolerable measurement errors for N=100 and Table III shows the tolerable measurement errors for N=200. Note that the number of measurements N is limited by whether the assumptions described above are valid (e.g., constant velocity, interacting with the same scatterers, etc.). Using more measurements makes method 10 less sensitive to the measurement errors. Method 10 is sensitive to TOA and DS errors, especially for low speeds. However, method 10 is not sensitive to AOA errors due to the averaging of AOA measurements.

It should be noted that since the values in Tables II and III were obtained assuming two of the three measurements are error free, they provide a somewhat overly optimistic view of method 10's performance. For example, one really needs TOA accuracy better than 1.3 ps (third row and second column of Table II) in order to achieve the desired accuracy when the AOA and DS measurements have errors. In the second set of results (see Table IV), method 10 is evaluated based on what measurement errors are tolerable that still satisfy the positioning requirement of less than 50 m accuracy in 67% of positioning attempts for 1 BS and S=2 scatterers. The results from Tables II through IV show that more accurate measurements are required in the case of 2 scatterers 16 when compared to the case of 3 scatterers 16: TOA errors that are less than one order of magnitude lower than the standard deviation of the 3 scatterer 16 case, AOA errors that are less than one-fourth the standard deviation of the 3 scatterer 16 case, and DS errors that are less than one-fifth the standard deviation of the 3 scatterer 16 case.

Figure 4:
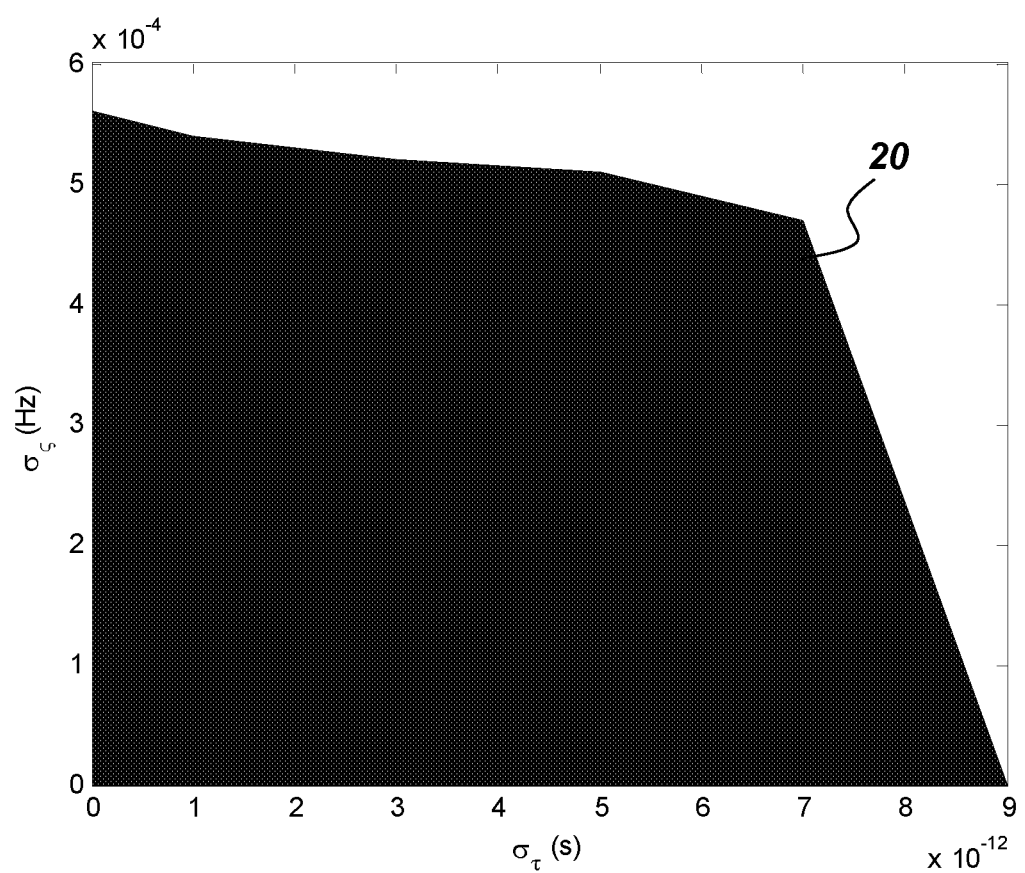
FIG. 4 is a graph of measurement errors.

FIG. 4 is a graph showing tolerable TOA and DS measurement errors (microcell, N=200, $\sigma_\theta$=2°). FIG. 4 gives an example of what measurement errors are tolerable when all three measurement errors are present simultaneously. In these results, the standard deviation of the AOA measurement error is constant at $\sigma_\theta$=2° (since it has already been seen that the algorithm is not sensitive to AOA errors) and the standard deviations of the TOA and DS measurement errors are varied. The shaded region 20 represents the TOA and DS errors that still satisfy the positioning requirement of less than 50 m accuracy in 67% of positioning attempts for 1 BS and S=2 scatterers in a microcellular environment with N=200. Notice that all of the tolerable measurement errors in FIG. 4 are less than their corresponding values in the last row of Table IV, which is expected because the presence of all three measurement errors simultaneously requires more accurate measurements to achieve the same positioning accuracy compared to when only one of the three measurement errors is present.

Figure 5:
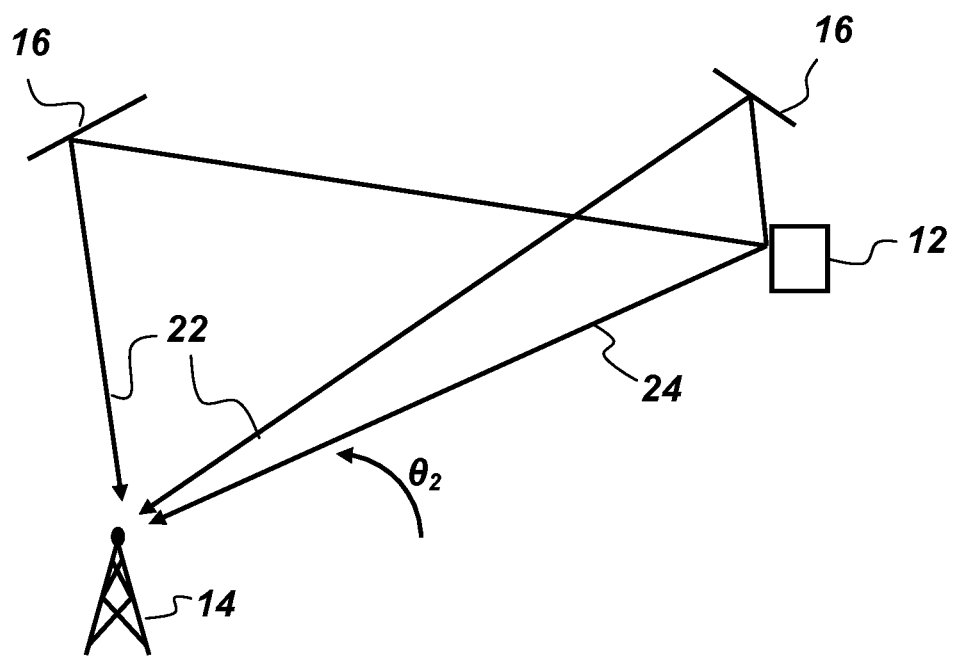
FIG. 5 is a 2-dimensional illustration of an operating environment.

FIG. 5 is a 2-dimensional representation of an environment comprising both NLOS propagation paths 22 and LOS propagation paths 24 between the MS 12 and the BS 14. An embodiment of method 10 may be used to estimate the position of the MS 12 in an environment such as is depicted in FIG. 5 with a combination of LOS and NLOS propagation paths. In this example, one BS 14 observes N uplink communication signals from one MS 12. The MS 12 is assumed to move at a constant velocity v for a period of time N∆t (which is small, where ∆t is the time between signal transmissions) while the N uplink signals are transmitted. Each of the N uplink signals arrives at the BS 14 via S distinct paths due to the presence of S scatterers 16. It is assumed that all NS signals undergo a single-bounce reflection with one scatterer 16 before arriving at the BS 14. Here, the term reflection refers to specular reflections. Any signals that undergo multiple bounces are assumed to be attenuated enough that their contribution at the BS 14 is negligible. It is also assumed that the clocks on the BS 14 and MS 12 are synchronized in time and frequency, using a technique such as two-way ranging. The position of the BS 14 is assumed to be fixed and known, and the positions of the scatterers 16 are assumed to be fixed and unknown. Both the MS 12 position and velocity are assumed to be unknown. As with previously-described embodiments, the current example of mixed NLOS/LOS embodiment of method 10 can readily be extended to cases with more than one BS 14.

Still referring to the mixed LOS/NLOS embodiment of method 10, the BS 14 measures the TOA $\tau$, AOA $\theta$, and DS $\varsigma$ of all NS signals. Again, let us first look at the measurements obtained from one BS 14 and one scatterer 16. From geometry, the distance between the scatterer and BS is given by $$d_{sc,bs}(n\Delta t) = \frac{x_{sc} - x_{bs}}{\cos(\theta(n\Delta t))} = \frac{y_{sc} - y_{bs}}{\sin(\theta(n\Delta t))} \quad (17)$$

where $[x_{sc}\ y_{sc}]^T$ is the position of the scatterer, $[x_{bs}\ y_{bs}]^T$ is the position of the BS, and $\theta(n\theta t)$ is the AOA measurement at time n∆t of the signal arriving at the BS 14 after reflecting off the scatterer 16 where n=0, . . . , N−1. Cross multiplying the terms in (17) produces $$x_{sc}\sin(\theta(n\Delta t)) - y_{sc}\cos(\theta(n\Delta t)) = x_{bs}\sin(\theta(n\Delta t)) - y_{bs}\cos(\theta(n\Delta t)) \quad (18)$$

The TOA measurement at time n∆t of the signal arriving at the BS 14 after reflecting off the scatterer 16 is given by equation (3) for n=0, . . . , N−1. The DS measurement at time n∆t of the signal arriving at the BS 14 after reflecting off the scatterer 16 is given by equation (4) for n=0, . . . , N−1. Since the BS 14 and scatterer 16 are both stationary, the DS observed at the BS 14 is the same as the DS observed at the scatterer 16.

If a LOS propagation path exists between the BS 14 and MS 12, then each of the N uplink signals arrives directly at the BS 14 in addition to the S NLOS arrivals due to scatterers 16. However, note that equations (17)-(18) and equations (3) and (4) still hold for LOS propagation paths with the following substitution $[x_{sc}\ y_{sc}]^T = [x_{bs}\ y_{bs}]^T$. At first glance, (17) and (18) might seem incorrect with the aforementioned substitution, but since $d_{sc,bs} = x_{sc} - x_{bs} = y_{sc} - y_{bs} = 0$ m, it is mathematically valid to divide 0 by any nonzero quantity. This "trick" will prove to be useful later because it maintains a parallelism in the equations pertaining to LOS paths and the equations pertaining to NLOS paths.

The mixed NLOS/LOS embodiment of method 10 uses the TOA, AOA, and DS measurements to estimate the MS position in three steps: LOS/NLOS identification, scatterer location and MS speed estimation, and MS position estimation. If desired, an additional step can be used to estimate the MS velocity once the MS position has been estimated. Regarding the LOS/NLOS identification step, the BS 14 has no prior knowledge of which uplink signals arrived via LOS or NLOS paths, so the first step is determining which signals arrived via LOS or NLOS propagation paths. Note that the AOA from LOS paths may be completely determined by the positions of the BS 14 and MS 12, whereas the AOA from NLOS paths is completely determined by the positions of the BS 14 and scatterer 16. Since the BS 14 and scatterers 16 are fixed, the AOA is constant for the uplink signals experiencing NLOS propagation. However, due to the movement of the MS, the AOA is not constant for the uplink signals experiencing LOS propagation (unless the MS 12 moves radially away from or towards the BS 14).

Figure 6:
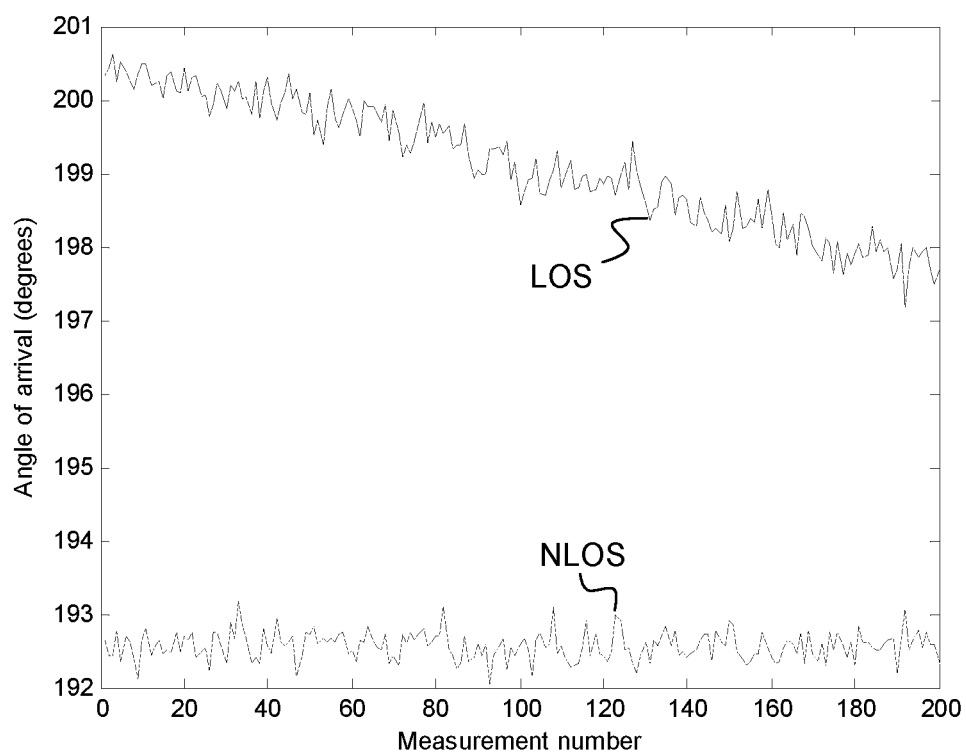
FIG. 6 is a graph of angle of arrival measurement data.

FIG. 6 is a graph showing the mean of 100 realizations of the AOA measurement arriving from a LOS path (upper trace) and NLOS path (lower trace). The simulation parameters are the same as those provided later. For LOS paths, the slope of the "line" varies with each scenario, but the absolute value of the slope is greater than a threshold a≈0 (as long as the MS is not moving radially away from or towards the BS). Based on this observation, least squares is used to estimate the parameters of a line (i.e., slope and intercept) that best fits the AOA measurements arriving from each path versus time. Denote the slope of the line for path i as $m_i$. Then, the following test is proposed to identify whether signals arrive via LOS or NLOS paths:

path i is LOS: $m_i \geq a$  (19)

path i is NLOS: $m_i < a$  (20)

Note that this LOS/NLOS identification algorithm is feasible since techniques exist that can correctly associate the AOA of each path with its corresponding TOA. Hence, there is no ambiguity with correctly associating which measurements correspond to which paths.

Next, in the mixed NLOS/LOS embodiment of method 10 the scatterer locations will be estimated for the NLOS paths.

Both LOS and NLOS paths will be used to estimate the scatterer locations. First, the equations produced from the LOS paths will be addressed followed by the equations produced from the NLOS paths. Substituting (17) into (5), and after some simplification, (5) can be written as $$-2\frac{f_T}{c}v_x x_{ms}(0) - 2\frac{f_T}{c}v_y y_{ms}(0) + \left(\varsigma(n\Delta t)\sec(\theta(n\Delta t)) + 2\frac{f_T}{c}v_x\right)x_{sc} + \left(\varsigma(n\Delta t)\csc(\theta(n\Delta t)) + 2\frac{f_T}{c}v_y\right)y_{sc} = \\ (2c\tau(n\Delta t) + x_{bs}\sec(\theta(n\Delta t)) + y_{bs}\csc(\theta(n\Delta t)))\varsigma(n\Delta t) + \\ 2\frac{f_T}{c}n\Delta t(v_x^2 + v_y^2)$$  (21)

Subtracting (21) at n=0 from (21) at n=1, ..., N−1 results in $$(\varsigma(n\Delta t)\sec(\theta(n\Delta t)) - \varsigma(0)\sec(\theta(0)))x_{sc} + \\ (\varsigma(n\Delta t)\csc(\theta(n\Delta t)) - \varsigma(0)\csc(\theta(0)))y_{sc} - 2\frac{f_T}{c}n\Delta t(v_x^2 + v_y^2) = \\ (2c\tau(n\Delta t) + x_{bs}\sec(\theta(n\Delta t)) + y_{bs}\csc(\theta(n\Delta t)))\varsigma(n\Delta t) - \\ (2c\tau(0) + x_{bs}\sec(\theta(0)) + y_{bs}\csc(\theta(0)))\varsigma(0)$$  (22)

for n=1, ..., N−1. Equations (18) and (22) are the equations that will be used later to describe the LOS paths.

For NLOS paths, equations (1) and (2) still apply, where θ is the mean of the N AOA measurements of the signals arriving at the BS after reflecting off the scatterer. Following the same approach as in the previous derivations now using (1) instead of (17), (18) can be written into equation (7) for n=1, ..., N−1. Equations (2) and (7) are the equations that will be used subsequently to describe the NLOS paths. Equations (18), (22), (2), and (7) can be combined for D distinct paths (the D paths are due to either the presence of S scatterers and one LOS path or S scatterers and no LOS path) to form a linear model as follows. Let $A_{i,LOS}$ and $b_{i,LOS}$ denote the equations corresponding to LOS path i, which are given by (23)-(24); and let $A_{j,NLOS}$ and $b_{j,NLOS}$ denote the equations corresponding to NLOS path j, which are given by (25)-(26).

$$A_{i,LOS} = \begin{bmatrix} \sin(\theta_i(0)) & -\cos(\theta_i(0)) \\ \vdots & \vdots \\ \sin(\theta_i((N-1)\Delta t)) & -\cos(\theta_i((N-1)\Delta t)) \\ \varsigma_i(\Delta t)\sec(\theta_i(\Delta t)) - \varsigma_i(0)\sec(\theta_i(0)) & \varsigma_i(\Delta t)\csc(\theta_i(\Delta t)) - \varsigma_i(0)\csc(\theta_i(0)) \\ \vdots & \vdots \\ \varsigma_i((N-1)\Delta t)\sec(\theta_i((N-1)\Delta t)) - \varsigma_i(0)\sec(\theta_i(0)) & \varsigma_i((N-1)\Delta t)\csc(\theta_i((N-1)\Delta t)) - \varsigma_i(0)\csc(\theta_i(0)) \end{bmatrix}$$  (23)

$$b_{i,LOS} = \begin{bmatrix} x_{bs}\sin(\theta_i(0)) - y_{bs}\cos(\theta_i(0)) \\ \vdots \\ x_{bs}\sin(\theta_i((N-1)\Delta t)) - y_{bs}\cos(\theta_i((N-1)\Delta t)) \\ (2c\tau_i(\Delta t) + x_{bs}\sec(\theta_i(\Delta t)) + y_{bs}\csc(\theta_i(\Delta t)))\varsigma_i(\Delta t) - (2c\tau_i(0) + x_{bs}\sec(\theta_i(0)) + y_{bs}\csc(\theta_i(0)))\varsigma_i(0) \\ \vdots \\ (2c\tau_i((N-1)\Delta t) + x_{bs}\sec((N-1)\Delta t) + y_{bs}\csc((N-1)\Delta t))\varsigma_i((N-1)\Delta t) - (2c\tau_i(0) + x_{bs}\sec(\theta_i(0)) + y_{bs}\csc(\theta_i(0)))\varsigma_i(0) \end{bmatrix}$$  (24)

$$A_{j,NLOS} = \begin{bmatrix} \sin\theta_j & -\cos\theta_j \\ \sec\theta_j(\varsigma_j(\Delta t) - \varsigma_j(0)) & \csc\theta_j(\varsigma_j(\Delta t) - \varsigma_j(0)) \\ \vdots & \vdots \\ \sec\theta_j(\varsigma_j((N-1)\Delta t) - \varsigma_j(0)) & \csc\theta_j(\varsigma_j((N-1)\Delta t) - \varsigma_j(0)) \end{bmatrix} \quad (25)$$

$$b_{j,NLOS} = \begin{bmatrix} x_{bs}\sin\theta_j - y_{bs}\cos\theta_j \\ (2c\tau_j(\Delta t) + x_{bs}\sec\theta_j + y_{bs}\csc\theta_j)\varsigma_j(\Delta t) - (2c\tau_j(0) + x_{bs}\sec\theta_j + y_{bs}\csc\theta_j)\varsigma_j(0) \\ \vdots \\ (2c\tau_j((N-1)\Delta t) + x_{bs}\sec\theta_j + y_{bs}\csc\theta_j)\varsigma_j((N-1)\Delta t) - (2c\tau_j(0) + x_{bs}\sec\theta_j + y_{bs}\csc\theta_j)\varsigma_j(0) \end{bmatrix} \quad (26)$$

Also define $$A_{v,LOS} = \begin{bmatrix} 0_{N\times 1} \\ -2\frac{f_T}{c}\Delta t \\ \vdots \\ -2\frac{f_T}{c}(N-1)\Delta t \end{bmatrix} \quad (27)$$

and $A_{v,NLOS}$=equation 10 so that the linear model is given by equation 11 where $$A = \begin{bmatrix} A_{1,LOS} & & & A_{v,LOS} \\ & A_{1,LOS} & & A_{v,NLOS} \\ & & \ddots & \vdots \\ & & & A_{S,NLOS} & A_{v,NLOS} \end{bmatrix} \quad (28)$$

and $$b = [b_{1,LOS} \; b_{1,NLOS} \; \cdots \; b_{S,NLOS}]^T \quad (29)$$

if one LOS and S NLOS paths exist, or $$A = \begin{bmatrix} A_{1,NLOS} & & & A_{v,NLOS} \\ & A_{2,NLOS} & & A_{v,NLOS} \\ & & \ddots & \vdots \\ & & & A_{S,NLOS} & A_{v,NLOS} \end{bmatrix} \quad (30)$$

and $$b = [b_{1,NLOS} \; b_{2,NLOS} \; \cdots \; b_{S,NLOS}]^T \quad (31)$$

if no LOS and S NLOS paths exist, and $$s = [x_{sc,1}y_{sc,1}x_{sc,2}y_{sc,2} \ldots x_{sc,D}y_{sc,D}v_x^2 + v_y^2]^T \quad (32)$$

Note that all of the entries in A besides the entries shown are 0. From equation (11), the least squares estimate of the positions of the scatterers and squared magnitude of the MS velocity is given by equation (15).

Still referring to the mixed NLOS/LOS embodiment of method 10, now that the positions of the scatterers 16 have been estimated, the position of the MS 12 can be estimated at any time $n\Delta t$ for $n=0, \ldots, N-1$ as follows. The distance between the MS 12 and scatterer i at time $n\Delta t$ is given by $$d_i(n\Delta t) = c\tau_i(n\Delta t) - \sqrt{(x_{bs} - \hat{x}_{sc,i})^2 + (y_{bs} - \hat{y}_{sc,i})_2} \quad (33)$$

For the NLOS paths, since the signals experience LOS propagation from the MS 12 to the scatterers 16 and estimates of both the scatterer positions and distance between the MS 12 and scatterers 16 are available, the problem is now that of a conventional TOA positioning problem (along with the LOS path between the MS 12 and BS 14, if present). One may use an iterative technique based on Taylor Series expansion around an initial MS 12 position estimate approximately equal to the position of the BS 14. Optionally, the scatterer 16 position estimates from (33) and the MS 12 position estimates from above can be substituted into (4) to solve for the MS 12 velocity using LS.

The inverse of a Fisher information matrix provides a lower bound on the covariance of any unbiased estimator of some deterministic parameter. The TOA, AOA, and DS measurements can be formulated as $$y = [c\tau_1 \theta_1 \varsigma_1 \ldots c\tau_D \theta_D \varsigma_D]^T + v^T \quad (34)$$

where $\tau_i$, $\theta_i$, and $\varsigma_i$ are the N truth measurements corresponding to the ith path and v is additive white Gaussian noise with standard deviation $\sigma_\tau$, $\sigma_\theta$, and $\sigma_\varsigma$ for the TOA, AOA, and DS measurements, respectively. Looking at (34), y is a multivariate Gaussian random variable with mean $\mu = [c\tau_1 \; \theta_1 \; \varsigma_1 \ldots c\tau_D \; \theta_D \; \theta_D \; \varsigma_D]^T$ and diagonal covariance matrix R. Based on the measurement model in (34), the Fisher information matrix associated with the parameter vector (35) is given by (36).

$$z = [x_{sc,1} \; y_{sc,1} \; \cdots \; x_{sc,D} \; y_{sc,D} \; v_x \; v_y \; x_{ms}(0) \; y_{ms}(0)]^T \quad (35)$$

$$J(z) = 2\frac{\partial \mu^T}{\partial z} R^{-1} \frac{\partial \mu}{\partial z} \quad (36)$$

A Cramér-Rao bound (CRB) is obtained by inverting (36).

All of the derivatives needed to calculate the Fisher information matrix (36) can be found as follows. First, the derivatives corresponding to NLOS measurements are derived. Then, the derivatives corresponding to LOS measurements are derived. Any term not shown is equal to zero. The derivatives corresponding to the NLOS measurements are calculated by taking the derivative of (1), (3), and (4) with respect to (35), and are given by (37)-(52). Note that (1) is formulated in terms of the arctangent function before taking the derivative.

$$\frac{\partial c\tau_i(k\Delta t)}{\partial x_{sc,i}} = \frac{x_{sc,i} - x_{ms}(k\Delta t)}{\sqrt{(x_{sc,i} - x_{ms}(k\Delta t))^2 + (y_{sc,i} - y_{ms}(k\Delta t))^2}} + \frac{x_{sc,i} - x_{bs}}{\sqrt{(x_{sc,i} - x_{bs})^2 + (y_{sc,i} - y_{bs})^2}} \quad (37)$$

-continued $$\frac{\partial c\tau_i(k\Delta t)}{\partial y_{sc,i}} = \frac{y_{sc,i} - y_{ms}(k\Delta t)}{\sqrt{(x_{sc,i} - x_{ms}(k\Delta t))^2 + (y_{sc,i} - y_{ms}(k\Delta t))^2}} + \quad (38)$$

$$\frac{y_{sc,i} - y_{bs}}{\sqrt{(x_{sc,i} - x_{bs})^2 + (y_{sc,i} - y_{bs})^2}}$$

$$\frac{\partial c\tau_i(k\Delta t)}{\partial v_x} = \frac{-x_{sc,i}k\Delta t + x_{ms}(0)k\Delta t + (k\Delta t)^2 v_x}{\sqrt{(x_{sc,i} - x_{ms}(k\Delta t))^2 + (y_{sc,i} - y_{ms}(k\Delta t))^2}} \quad (39)$$

$$\frac{\partial c\tau_i(k\Delta t)}{\partial v_y} = \frac{-y_{sc,i}k\Delta t + y_{ms}(0)k\Delta t + (k\Delta t)^2 v_y}{\sqrt{(x_{sc,i} - x_{ms}(k\Delta t))^2 + (y_{sc,i} - y_{ms}(k\Delta t))^2}} \quad (40)$$

$$\frac{\partial c\tau_i(k\Delta t)}{\partial x_{ms}(0)} = \frac{-x_{sc,i} + x_{ms}(0) + v_x k\Delta t}{\sqrt{(x_{sc,i} - x_{ms}(k\Delta t))^2 + (y_{sc,i} - y_{ms}(k\Delta t))^2}} \quad (41)$$

$$\frac{\partial c\tau_i(k\Delta t)}{\partial y_{ms}(0)} = \frac{-y_{sc,i} + y_{ms}(0) + v_y k\Delta t}{\sqrt{(x_{sc,i} - x_{ms}(k\Delta t))^2 + (y_{sc,i} - y_{ms}(k\Delta t))^2}} \quad (42)$$

$$\frac{\partial \theta_i(k\Delta t)}{\partial x_{sc,i}} = -\frac{y_{sc,i} - y_{bs}}{(x_{sc,i} - x_{bs})^2 + (y_{sc,i} - y_{bs})^2} \quad (43)$$

$$\frac{\partial \theta_i(k\Delta t)}{\partial y_{sc,i}} = \left(\frac{1}{1 + ((y_{sc,i} - y_{bs})/(x_{sc,i} - x_{bs}))^2}\right)\left(\frac{1}{x_{sc,i} - x_{bs}}\right) \quad (44)$$

$$h(k\Delta t) = v_x(x_{sc,i} - x_{ms}(k\Delta t)) + v_y(y_{sc,i} - y_{ms}(k\Delta t)) \quad (45)$$

$$g(k\Delta t) = \sqrt{(x_{sc,i} - x_{ms}(k\Delta t))^2 + (y_{sc,i} - y_{ms}(k\Delta t))^2} \quad (46)$$

$$\frac{\partial \varsigma_i(k\Delta t)}{\partial x_{sc,i}} = \frac{f_T}{c}\left(\frac{v_x}{g(k\Delta t)} - \frac{h(k\Delta t)(x_{sc,i} - x_{ms}(0) - v_x k\Delta t)}{g^3(k\Delta t)}\right) \quad (47)$$

$$\frac{\partial \varsigma_i(k\Delta t)}{\partial y_{sc,i}} = \frac{f_T}{c}\left(\frac{v_y}{g(k\Delta t)} - \frac{h(k\Delta t)(y_{sc,i} - y_{ms}(0) - v_y k\Delta t)}{g^3(k\Delta t)}\right) \quad (48)$$

$$\frac{\partial \varsigma_i(k\Delta t)}{\partial v_x} = \frac{f_T}{c}\left(\frac{x_{sc,i} - x_{ms}(0) - 2v_x k\Delta t}{g(k\Delta t)} - \right. \quad (49)$$

$$\left.\frac{h(k\Delta t)(-x_{sc,i}k\Delta t + x_{ms}(0)k\Delta t + (k\Delta t)^2 v_x)}{g^3(k\Delta t)}\right)$$

$$\frac{\partial \varsigma_i(k\Delta t)}{\partial v_y} = \frac{f_T}{c}\left(\frac{y_{sc,i} - y_{ms}(0) - 2v_y k\Delta t}{g(k\Delta t)} - \right. \quad (50)$$

$$\left.\frac{h(k\Delta t)(-y_{sc,i}k\Delta t + y_{ms}(0)k\Delta t + (k\Delta t)^2 v_y)}{g^3(k\Delta t)}\right)$$

$$\frac{\partial \varsigma_i(k\Delta t)}{\partial x_{ms}(0)} = \frac{f_T}{c}\left(-\frac{v_x}{g(k\Delta t)} - \frac{h(k\Delta t)(-x_{sc,i} + x_{ms}(0) + v_x k\Delta t)}{g^3(k\Delta t)}\right) \quad (51)$$

$$\frac{\partial \varsigma_i(k\Delta t)}{\partial y_{ms}(0)} = \frac{f_T}{c}\left(-\frac{v_y}{g(k\Delta t)} - \frac{h(k\Delta t)(-y_{sc,i} + y_{ms}(0) + v_y k\Delta t)}{g^3(k\Delta t)}\right) \quad (52)$$

Similarly, the derivatives corresponding to the LOS measurements are calculated by taking the derivative of (17), (3), and (4) with respect to (35), except for the following modifications which are made before the derivative is taken. In (3) and (4), $[x_{sc,i}\ y_{sc,i}]^T$ is replaced with $[x_{bs}\ y_{bs}]^T$. In (17), $[x_{sc,i}\ y_{sc,i}]^T$ is replaced with $[x_{ms}(k\Delta t)\ y_{ms}(k\Delta t)]^T$. The derivatives corresponding to the LOS measurements are given by (53)-(60). Equations (39)-(42) and (47)-(52) also apply to the derivatives corresponding to the LOS measurements.

$$\frac{\partial c\tau_i(k\Delta t)}{\partial x_{sc,i}} = \frac{x_{sc,i} - x_{ms}(k\Delta t)}{\sqrt{(x_{sc,i} - x_{ms}(k\Delta t))^2 + (y_{sc,i} - y_{ms}(k\Delta t))^2}} \quad (53)$$

-continued $$\frac{\partial c\tau_i(k\Delta t)}{\partial y_{sc,i}} = \frac{y_{sc,i} - y_{ms}(k\Delta t)}{\sqrt{(x_{sc,i} - x_{ms}(k\Delta t))^2 + (y_{sc,i} - y_{ms}(k\Delta t))^2}} \quad (54)$$

$$\frac{\partial \theta_i(k\Delta t)}{\partial x_{sc,i}} = \frac{y_{ms}(0) + v_y k\Delta t - y_{bs}}{(x_{ms}(0) + v_x k\Delta t - x_{bs})^2 + (y_{ms}(0) + v_y k\Delta t - y_{bs})^2} \quad (55)$$

$$\frac{\partial \theta_i(k\Delta t)}{\partial y_{sc,i}} = -\left(\frac{1}{1 + ((y_{ms}(0) + v_y k\Delta t - y_{bs})/(x_{ms}(0) + v_x k\Delta t - x_{bs}))^2}\right) \quad (56)$$

$$\left(\frac{1}{x_{ms}(0) + v_x k\Delta t - x_{bs}}\right)$$

$$\frac{\partial \theta_i(k\Delta t)}{\partial v_x} = -\frac{(y_{ms}(0) + v_y k\Delta t - y_{bs})k\Delta t}{(x_{ms}(0) + v_x k\Delta t - x_{bs})^2 + (y_{ms}(0) + v_y k\Delta t - y_{bs})^2} \quad (57)$$

$$\frac{\partial \theta_i(k\Delta t)}{\partial v_y} = \left(\frac{1}{1 + ((y_{ms}(0) + v_y k\Delta t - y_{bs})/(x_{ms}(0) + v_x k\Delta t - x_{bs}))^2}\right) \quad (58)$$

$$\left(\frac{k\Delta t}{x_{ms}(0) + v_x k\Delta t - x_{bs}}\right)$$

$$\frac{\partial \theta_i(k\Delta t)}{\partial x_{ms}(0)} = -\frac{y_{ms}(0) + v_y k\Delta t - y_{bs}}{(x_{ms}(0) + v_x k\Delta t - x_{bs})^2 + (y_{ms}(0) + v_y k\Delta t - y_{bs})^2} \quad (59)$$

$$\frac{\partial \theta_i(k\Delta t)}{\partial y_{ms}(0)} = \left(\frac{1}{1 + ((y_{ms}(0) + v_y k\Delta t - y_{bs})/(x_{ms}(0) + v_x k\Delta t - x_{bs}))^2}\right) \quad (60)$$

$$\left(\frac{1}{x_{ms}(0) + v_x k\Delta t - x_{bs}}\right)$$

Using both LOS and NLOS paths results in better estimation accuracy of the scatterer locations than only using the NLOS paths, which pertains to (11) and (28)-(29). In terms of the estimation parameter vector given by (32), path i depends on its nuisance parameters $[x_{sc,i}\ y_{sc,i}]$ and the parameter of interest $v_x^2 + v_y^2$. The LOS paths have been identified in the first step of the method, so their nuisance parameters are known to be the location of the BS. However, by Theorem 1 of the paper by K. Papakonstantinou, D. Slock, "Identifiability and performance concerns for location estimation," *Proc. IEEE ICASSP*, Taipei, Taiwan, April 2009, pp. 2097-2100, which is incorporated by reference herein, using the measurements from the LOS path will improve the estimation performance of an efficient estimator if $\partial \mu_{LOS}/\partial z_{LOS}$ has more rows than columns and full rank 2; where $\mu_{LOS} = [c\tau_{LOS}\ \theta_{LOS}\ \varsigma_{LOS}]^T$ is the 3N×1 vector of truth measurements corresponding to the LOS path and $z_{LOS} = [x_{sc,LOS}\ y_{sc,LOS}]^T$. $\partial \mu_{LOS}/\partial z_{LOS}$ has more rows than columns if N≥1, and it is evident upon substituting (53)-(56) and (47)-(48) into $\partial \mu_{LOS}/\partial z_{LOS}$ that $\partial \mu_{LOS}/\partial z_{LOS}$ has full rank 2.

The performance of the mixed LOS/NLOS embodiment of method 10 was demonstrated through Monte Carlo simulations with 1000 realizations in a microcellular environment consisting of one BS 14 and two scatterers 16, resulting in one LOS path and two NLOS paths between the MS 12 and BS 14. The initial position of the MS 12 is $[x_{ms}(0)\ y_{ms}(0)]^T = [5000\ m\ 5000\ m]^T$; and the positions of the BS 14 and scatterers 16 were chosen according to an independent and identically distributed (i.i.d.) Gaussian random variable with mean 5000 m and standard deviation $\sigma_{BS} = 1$ km and $\sigma_{SC} = 700$ m, respectively. The velocity of the MS 12 was $[v_x\ v_y]^T = [5\ m/s\ 9\ m/s]^T$, $\Delta t = 50$ ms, $f_T = 2.1$ GHz, and N=200.

Figure 7:
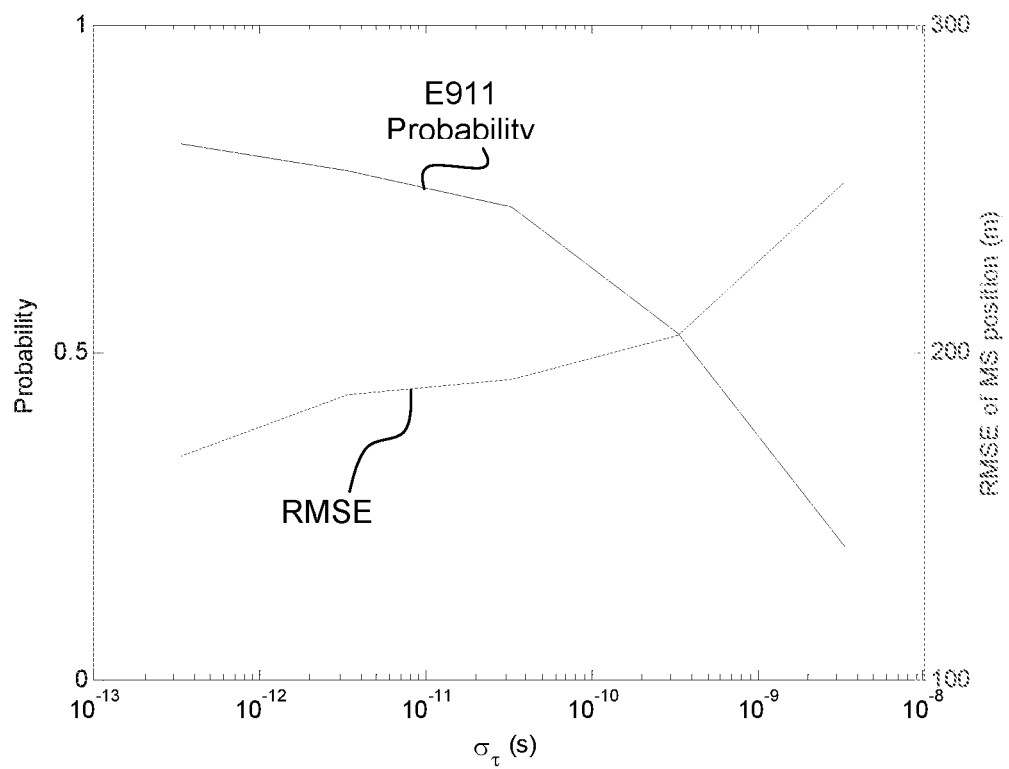
FIG. 7 is a graph of probability and root mean square error data.
Figure 8:
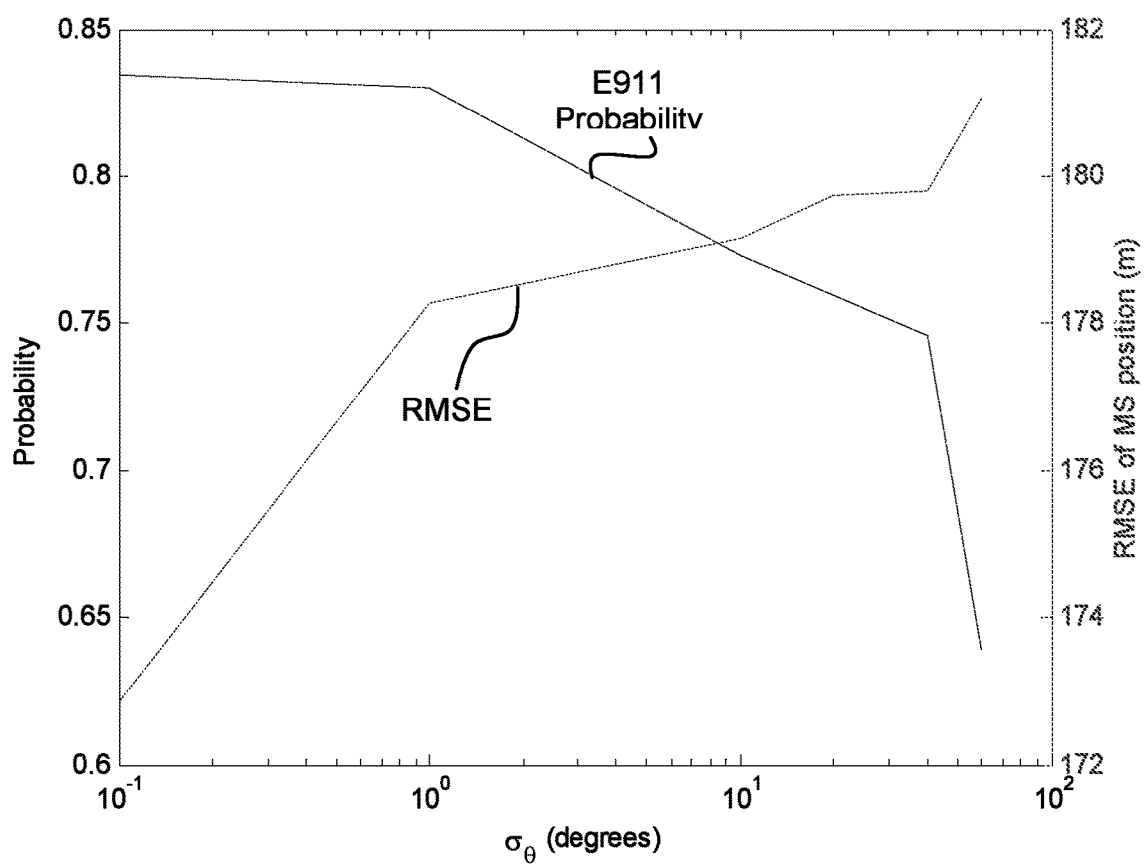
FIG. 8 is a graph of probability and root mean square error data.
Figure 9:
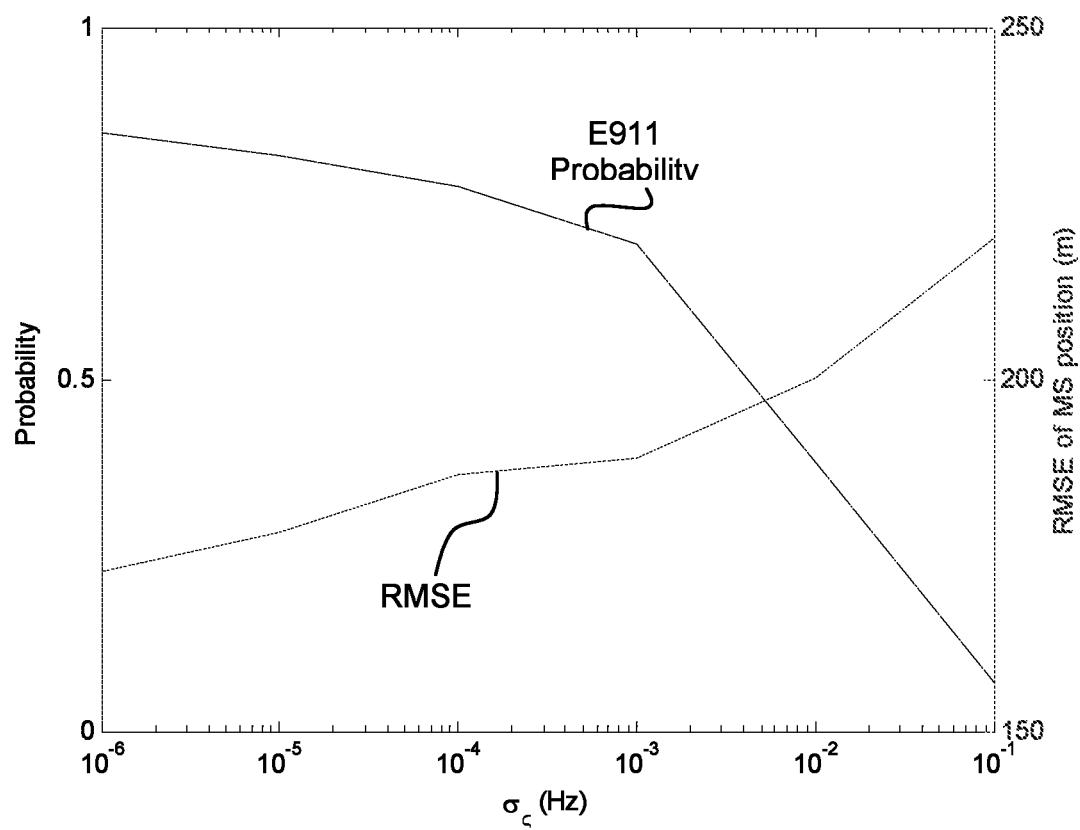
FIG. 9 is a graph of probability and root mean square error data.

FIGS. 7-9 are graphs showing the probability that the position error is less than 100 m and root mean square error (RMSE) for the three types of measurement errors. Only one of the measurements at each time step has errors, while the other two are perfect. For each figure, only the subject error measurement (i.e., TOA, AOA, or DS) has i.i.d. zero mean Gaussian noise with a standard deviation denoted by the x-axis and the rest of measurements are perfect. FIG. 7 shows the E911 probability and RMSE of MS position versus TOA measurement errors. FIG. 8 shows E911 probability and RMSE of MS position versus AOA measurement errors. FIG. 9 shows E911 probability and RMSE of MS position versus DS measurement errors. As expected, the positioning accuracy in terms of RMSE degrades as the standard deviation of each measurement error increases. The reason the RMSE does not go to zero as the measurement error decreases is due to poor geometry of the BS 14, scatterers 16, and MS 12 in specific Monte Carlo realizations.

Enhanced 911 requires a position accuracy of less than 100 m in 67% of positioning attempts for network-based positioning methods. Looking at FIGS. 9 through 11, it can be seen that $\sigma_\tau \approx 100$ ps, $\sigma_\theta \approx 50°$, $\sigma_\varsigma \approx 1$ mHz are required to achieve the accuracy mandated by the Enhanced 911 positioning requirement. It should be noted that since these standard deviations were obtained assuming two of the three measurements are error free, they provide a somewhat overly optimistic view of method 10's performance. For example, one really needs TOA accuracy better than 100 ps in order to achieve the desired accuracy when the AOA and DS measurements have errors. The reason for looking at only one error at a time is to give a fair insight into how sensitive the method is to each type of measurement. Notice from FIG. 8 that the mixed LOS/NLOS embodiment of method 10 is not sensitive to AOA errors due, in part, to the averaging of AOA measurements for NLOS paths.

Figure 10:
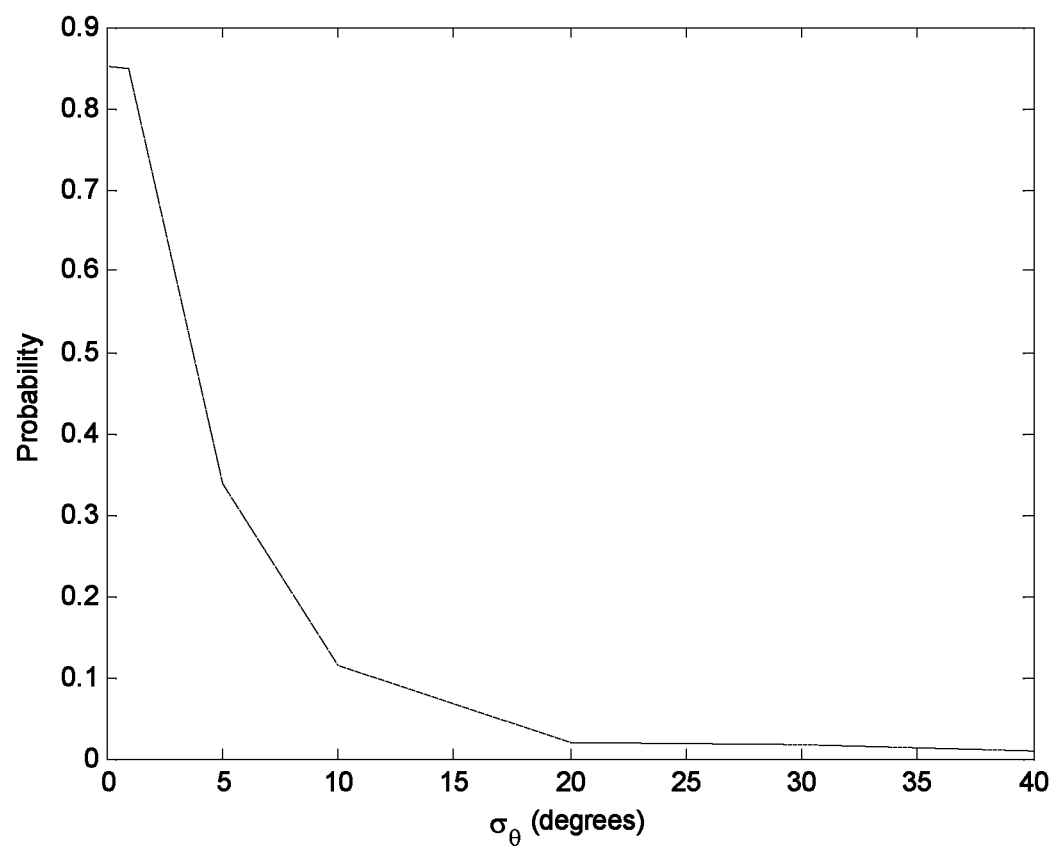
FIG. 10 is a graph of probability and error data.

FIG. 10 is a graph showing the probability that the LOS path is correctly identified versus $\sigma_\theta$. The mixed LOS/NLOS embodiment of method 10 can satisfy the Enhanced 911 positioning requirement and not experience much degradation in RMSE performance even though its LOS identification probability degrades with increasing $\sigma_\theta$, which is explained by the subsequent reasons. The first reason is that the N equations produced by (18) for a LOS path can be approximated by equation (2).

Proof Adding the N equations of (18) produces $$x_{sc}\sum_{n=0}^{N-1}\sin(\theta(n\Delta t)) - y_{sc}\sum_{n=0}^{N-1}\cos(\theta(n\Delta t)) = \qquad (61)$$
$$x_{bs}\sum_{n=0}^{N-1}\sin(\theta(n\Delta t)) - y_{bs}\sum_{n=0}^{N-1}\cos(\theta(n\Delta t))$$

Under the assumptions of the system model (constant MS velocity and stationary BS), (61) can be rewritten as $$x_{sc}\sum_{k=-N/2}^{N/2}\sin(\theta + k\varepsilon) - y_{sc}\sum_{k=-N/2}^{N/2}\cos(\theta + k\varepsilon) = \qquad (62)$$
$$x_{bs}\sum_{k=-N/2}^{N/2}\sin(\theta + k\varepsilon) - y_{bs}\sum_{k=-N/2}^{N/2}\cos(\theta + k\varepsilon)$$

for some scalar $\varepsilon$. Substituting the trig identities $$\sum_{k=-R/2}^{R/2}\sin(x + k\varepsilon) = \frac{\sin((R+1)\varepsilon/2)\sin(x + R\varepsilon/2)}{\sin(\varepsilon/2)} \qquad (63)$$

$$\sum_{k=-R/2}^{R/2}\cos(x + k\varepsilon) = \frac{\sin((R+1)\varepsilon/2)\cos(x + R\varepsilon/2)}{\sin(\varepsilon/2)} \qquad (64)$$

into (62), and using L'Hôpital's rule for the limit as $\varepsilon \to 0$, produces (2). □

Since the mean value of $\varepsilon \approx 5 \times 10^{-4}$ in the 1000 Monte Carlo scenarios, the approximation of (18) with (2) is valid. The second reason is that, in many cases, the difference between each AOA measurement and the mean is small, hence using (7) instead of (22) only results in small degradation. In the 1000 scenarios, the mean and standard deviation of the maximum difference are approximately three and nine degrees, respectively.

Figure 11:
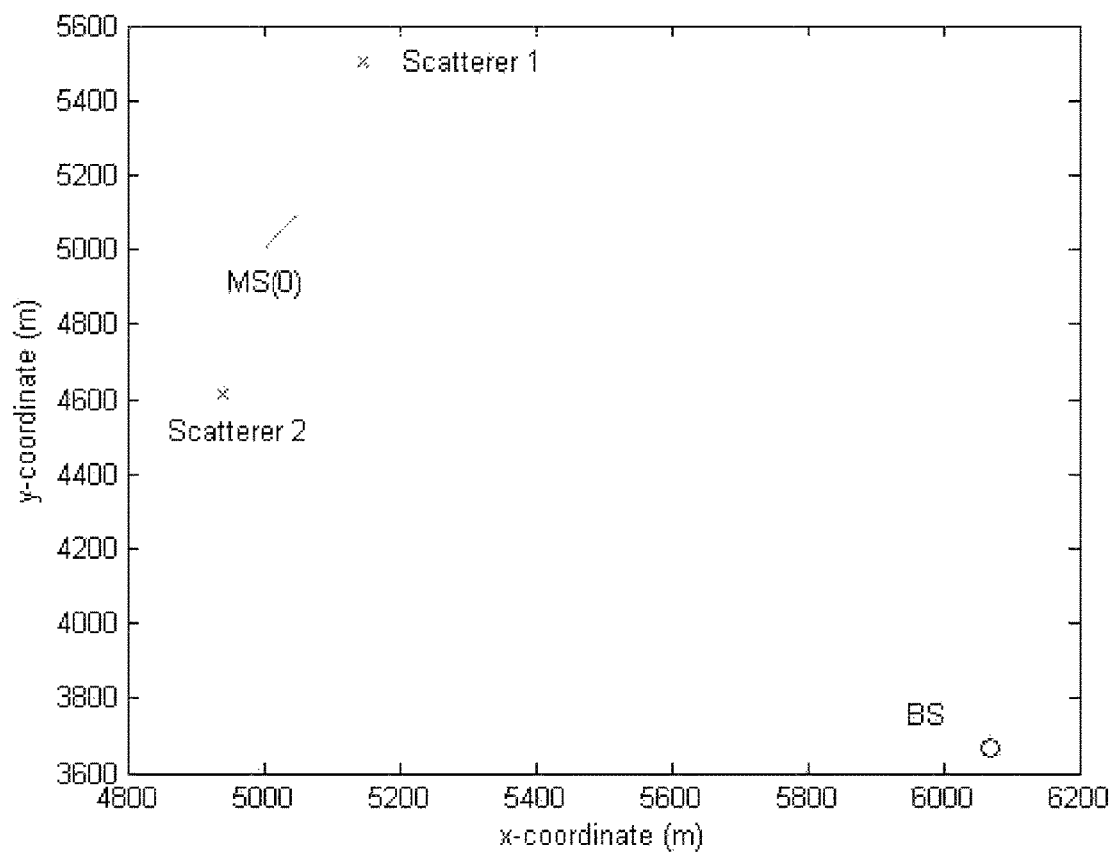
FIG. 11 is a graph showing the coordinates of a base station and signal scatterers.

FIG. 11 is a graph showing the locations of the BS 14 and scatterers 16 for the results in Table V. Table V provides insight into the performance of the proposed algorithm when all three measurement errors are present simultaneously. In these results, the locations of the BS and scatterers are as shown in FIG. 11, which was the best scenario out of the 1000 Monte Carlo simulations in terms of RMSE performance. Column 1 shows the measurement errors for three scenarios, Columns 2 through 5 show the square root of the mean squared error (MSE) and CRB of the initial MS position, Column 6 shows the probability that the position error is less than 100 m, and Column 7 shows the probability that the LOS path is correctly identified. Looking at Columns 2 through 5, as the measurement errors decrease, the difference between the proposed algorithm's performance (i.e., square root of the MSE) and the square root of the CRB is approximately a factor of 2. This performance gap can be accounted for because the LS estimator is not an efficient estimator for the linear system model given by (11). Also, the equations (22) and (7) are obtained by subtracting measurements which increases the variance of the measurement error. Looking at Columns 6 and 7, the mixed LOS/NLOS embodiment of method 10 can still satisfy the Enhanced 911 positioning requirement even with a low LOS identification probability, as explained earlier.

TABLE V

MSE, CRB, AND E911 AND LOS ID PROBABILITIES (1 LOS AND 2 NLOS PATHS)

| Scenario | $\sqrt{MSE}$ $x_{MS}(0)$ | $\sqrt{CRB}$ $x_{MS}(0)$ | $\sqrt{MSE}$ $y_{MS}(0)$ | $\sqrt{CRB}$ $y_{MS}(0)$ | E911 prob. | LOS ID prob. |
|---|---|---|---|---|---|---|
| $\sigma_\tau$ = 333 ps, $\sigma_\varsigma$ = 5 mHz, | 29.23 m | 6.73 m | 24.38 m | 5.83 m | 0.66 | 0.13 |
| $\sigma_\tau$ = 33 ps, $\sigma_\varsigma$ = 1 mHz, | 6.99 m | 3.35 m | 5.59 m | 2.74 m | 0.986 | 0.39 |

TABLE V-continued

MSE, CRB, AND E911 AND LOS ID PROBABILITIES (1 LOS AND 2 NLOS PATHS)

| Scenario | $\sqrt{MSE}$ $x_{MS}(0)$ | $\sqrt{CRB}$ $x_{MS}(0)$ | $\sqrt{MSE}$ $y_{MS}(0)$ | $\sqrt{CRB}$ $y_{MS}(0)$ | E911 prob. | LOS ID prob. |
|---|---|---|---|---|---|---|
| $\sigma_\tau$ = 3.3 ps, $\sigma_\varsigma$ = 0.1 mHz, | 1.33 m | 0.67 m | 1.0 m | 0.54 m | 1 | 1 |

Figure 12:
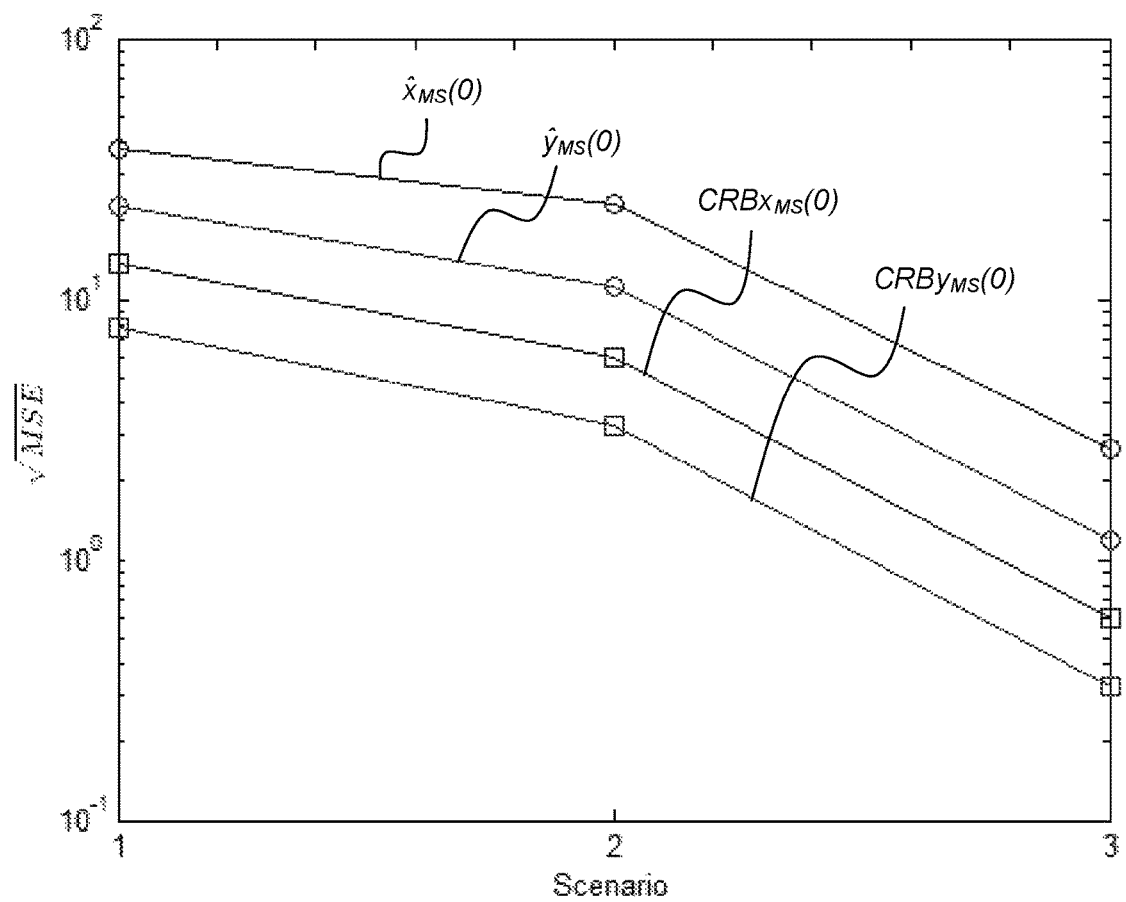
FIG. 12 is a graph showing the square root of the mean squared error and Cramér-Rao bound of the initial position of a mobile station in different scenarios.

FIG. 12 is a graph showing the square root of the MSE and CRB of the initial MS 12 position for three scenarios when all three measurement errors are present simultaneously and only two NLOS paths are present between the MS 12 and BS 14. The simulation parameters are the same as earlier with $[x_{bs}\ y_{bs}]^T = [4508.89\ m\ 4079.01\ m]^T$, $[x_{sc,1}\ y_{sc,1}]^T = [4416.74\ m\ 4277.98\ m]^T$, and $[x_{sc,2}\ y_{sc,2}]^T = [5085.94\ m\ 5251.15\ m]^T$. In scenario 1, $\sigma_\tau$=50 ps, $\sigma_\varsigma$ =5 mHz, and $\sigma_\theta$=20°; in scenario 2, $\sigma_\tau$=10 ps, $\sigma_\varsigma$ =1 mHz, and $\sigma_\theta$=10°; and in scenario 3, $\sigma_\tau$=1 ps, $\sigma_\varsigma$ =0.1 mHz, and $\sigma_\theta$=1°. Comparing FIG. 12 to the results in Table V show that more accurate measurements are required to obtain an accurate MS position estimate when only two paths are available compared to the case of when three paths are available. Furthermore, looking at FIG. 12, the difference between the mixed LOS/NLOS embodiment of method 10's performance and the square root of the CRB is approximately a factor of four, which is slightly worse than before. All of this is due to less measurements being available in the two-path case compared to the three-path case.

Even though method 10 estimates the position of the MS 12 using TOA, AOA, and DS measurements collected at the BS 14, and not how to estimate the TOA, AOA, and DS measurements, a comment must be made on the feasibility of the accurate TOA and DS measurements seen in the previous section. The CRB of the TOA estimate is inversely proportional to the product of the signal-to-noise ratio (SNR) and square of the bandwidth of the uplink signal; and the CRB of the DS estimate is inversely proportional to the product of the uplink signal's SNR, square of the sampling time interval, and cube of the number of uplink signal samples. Hence, with sufficiently high SNR, along with other appropriate parameters (e.g., uplink signal bandwidth, number of samples collected at the BS, etc.), accurate TOA and DS measurements are indeed feasible.

The CRB of the MS 12 position estimate also provides some interesting insights. It can be observed (using simulations), that the CRB of the MS 12 position estimate improves as either $f_T$, $v_x$, $v_y$, or N increases or $\sigma_\tau$, $\sigma_\varsigma$, or $\sigma_\theta$ decreases. Increasing N is limited by whether the system model assumptions are valid (e.g., constant velocity, interacting with the same scatterers, etc.), however increasing $f_T$ has good implications for 5 G where the frequencies are expected to be greater than 3 GHz. An interesting case is seen when the CRB is analyzed through Monte Carlo simulations with 1000 realizations in a picocellular environment consisting of one BS 14 and one scatterer 16, resulting in zero LOS paths and one NLOS path between the MS 12 and BS 14. The simulation parameters are the same as earlier, except for the following: the positions of the BS 14 and scatterers 16 are chosen according to an i.i.d. Gaussian random variable with mean 5000 m and standard deviation $\sigma_{BS}=\sigma_{SC}=100$ m, $[v_x,\ v_y]^T = [0.6\ m/s\ -0.8\ m/s]^T$, $f_T$=10 GHz, $\sigma_\tau$=1 ps, $\sigma_\varsigma$ =0.1 mHz, and $\sigma_\theta$=1°. The CRB of the MS 12 position estimate shows that it is possible to estimate the MS 12 position in approximately 50% of the scenarios with the square root of the CRB of the x- and y-coordinate of the initial MS 12 position being approximately 2 m. This percentage increases to over 99% if two NLOS paths are present, so the likely reason is poor geometry of the MS 12, BS 14, and scatterer 16 for the 50% of scenarios that MS 12 position estimation is not possible. MS 12 position estimation is not possible when the same scenarios are simulated with one LOS path and zero NLOS paths between the MS 12 and BS 14, which further shows the advantage in position estimation that NLOS paths can provide.

From the above description of method 10, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

I claim:

1. A method for estimating the position of a mobile station (MS) comprising the following steps:
   physically moving the MS at a constant velocity v in an environment comprising S stationary scatterers;
   wirelessly transmitting N uplink communication signals from a transmitter physically mounted to the MS;
   receiving each of the N uplink signals via D distinct paths at a fixed-location base station (BS);
   recording with the BS a time of arrival (TOA) τ, an angle-of-arrival (AOA) θ, and a Doppler-shifted frequency (DSF) ς of each received uplink signal;
   estimating a location of S scatterers using a system of linear equations;
   estimating the speed v of the MS using a system of linear equations; and
   estimating the location of the MS using a least squares algorithm based on the TOA, the AOA, and the DSF.

2. The method of claim 1, wherein the MS moves through line-of-sight (LOS) and non-line-of-sight (NLOS) zones within the environment.

3. The method of claim 2, wherein each received NLOS uplink signal undergoes a single-bounce reflection with one stationary scatterer.

4. The method of claim 3, wherein the least squares algorithm comprises the following step:
   estimating the location of the MS using nonlinear least squares.

5. The method of claim 4, wherein the clocks on the BS and the MS are synchronized in time and frequency.

6. The method of claim 3, wherein each reflection comprises specular reflection.

7. The method of claim 2, wherein every received uplink signal is treated by the BS as if every received uplink signal followed an NLOS propagation path regardless of the action propagation path.

8. The method of claim 1, wherein the environment comprises only non-line-of-sight (NLOS) propagation paths.

9. The method of claim 8, wherein each received uplink signal undergoes a single-bounce reflection with one stationary scatterer.

10. The method of claim 9, wherein the least squares algorithm comprises the following step:
estimating the location of the MS using nonlinear least squares.

11. The method of claim 10, wherein the clocks on the BS and the MS are synchronized in time and frequency.

12. The method of claim 9, where in each reflection contains specular reflection.

13. A method for estimating the position of a mobile station (MS) comprising the following steps:

physically moving the MS at a constant velocity v through line-of-sight (LOS) and non-line-of-sight (NLOS) zones within an environment comprising S stationary scatterers;

wirelessly transmitting N uplink communication signals from a transmitter physically mounted to the MS;

receiving at least 2 N uplink signals at a fixed-location base station (BS), wherein every received uplink signal is treated by the BS as if every received uplink signal followed an NLOS propagation path regardless of the actual propagation path;

recording with the B S a time of arrival (TOA) $\tau$, an angle-of-arrival (AOA) $\theta$, and a Doppler-shifted frequency (DSF) $\varsigma$ of each received uplink signal;

estimating a location of S scatterers using a system of linear equations;

estimating the speed v of the MS using a system of linear equations; and estimating the location of the MS using a least squares algorithm based on the TOA, the AOA, and the DSF.

14. The method of claim 13, wherein the clocks on the BS and the MS are synchronized in time and frequency.

* * * * *